United States Patent [19]

Anderson

[11] Patent Number: 5,263,423
[45] Date of Patent: Nov. 23, 1993

[54] ARTICLE SECUREMENT DEVICE

[76] Inventor: Rolf Anderson, 131 S. Clark, Box 246, Forest City, Iowa 50436

[21] Appl. No.: 13,203

[22] Filed: Feb. 1, 1993

Related U.S. Application Data

[63] Continuation of Ser. No. 832,467, Feb. 7, 1992, abandoned.

[51] Int. Cl.⁵ .............................................. A47B 23/00
[52] U.S. Cl. ........................................ 108/43; 248/444
[58] Field of Search ...................... 100/43, 45, 42, 129, 100/130; 248/444

[56] References Cited

U.S. PATENT DOCUMENTS

| | | | |
|---|---|---|---|
| 615,480 | 12/1898 | Englund | 248/444 |
| 2,420,673 | 5/1947 | Monrad | 108/43 X |
| 2,670,260 | 2/1954 | Watt | 108/43 X |
| 3,828,696 | 8/1974 | Lockridge | 108/43 |
| 4,518,164 | 5/1985 | Hayford, Jr. | 108/43 X |
| 4,715,293 | 12/1987 | Cobbs | 108/43 |

FOREIGN PATENT DOCUMENTS

| | | | |
|---|---|---|---|
| 716843 | 10/1931 | France | 248/444 |
| 220337 | 8/1924 | United Kingdom | 248/444 |

*Primary Examiner*—José V. Chen
*Attorney, Agent, or Firm*—Kent A. Herink; Brian J. Laurenzo; Brett J. Trout

[57] ABSTRACT

A securement device for releasable attachment of a laptop computer or other article to a user's leg includes a table member and a pair of in-folding leg members, one each of which is attached for hinged movement relative to a corresponding side edge portion of the table member. Elastic webbing interconnects the free end portion of each leg member to a central portion on the underside of the table member. The securement device is centered on a user's leg and a pair of coacting straps are used to snugly encircle the user's leg to prevent pivotal movement of the securement device relative thereto and the leg members brace the table member to prevent displacement thereof as a result of ordinary unbalanced imposed forces. Elastic straps are provided whereby an article such as a laptop computer may be releasably attached to the supporting surface of the table member. The securement device allows a user of a laptop computer to stand and walk a few steps without displacing the laptop computer. When removed from a user's leg, the securement device folds to a compact storage position.

10 Claims, 3 Drawing Sheets

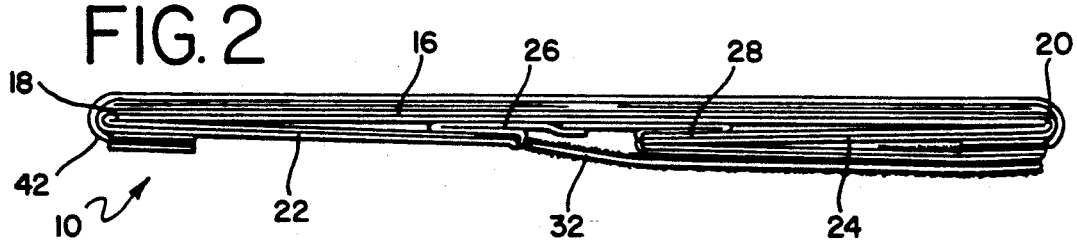
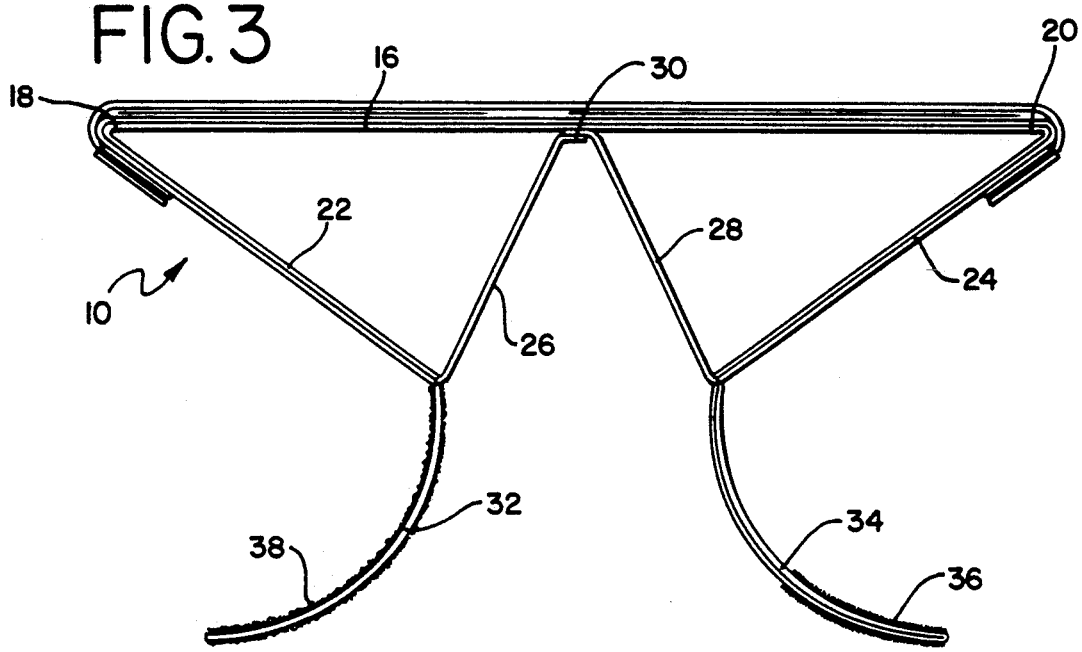
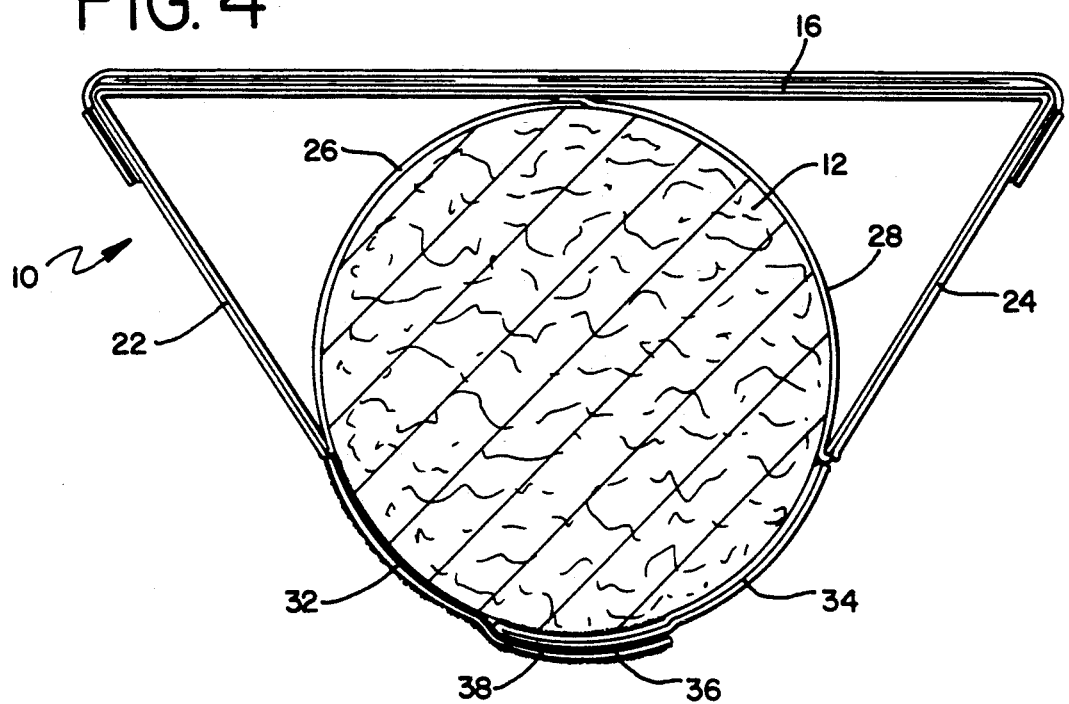

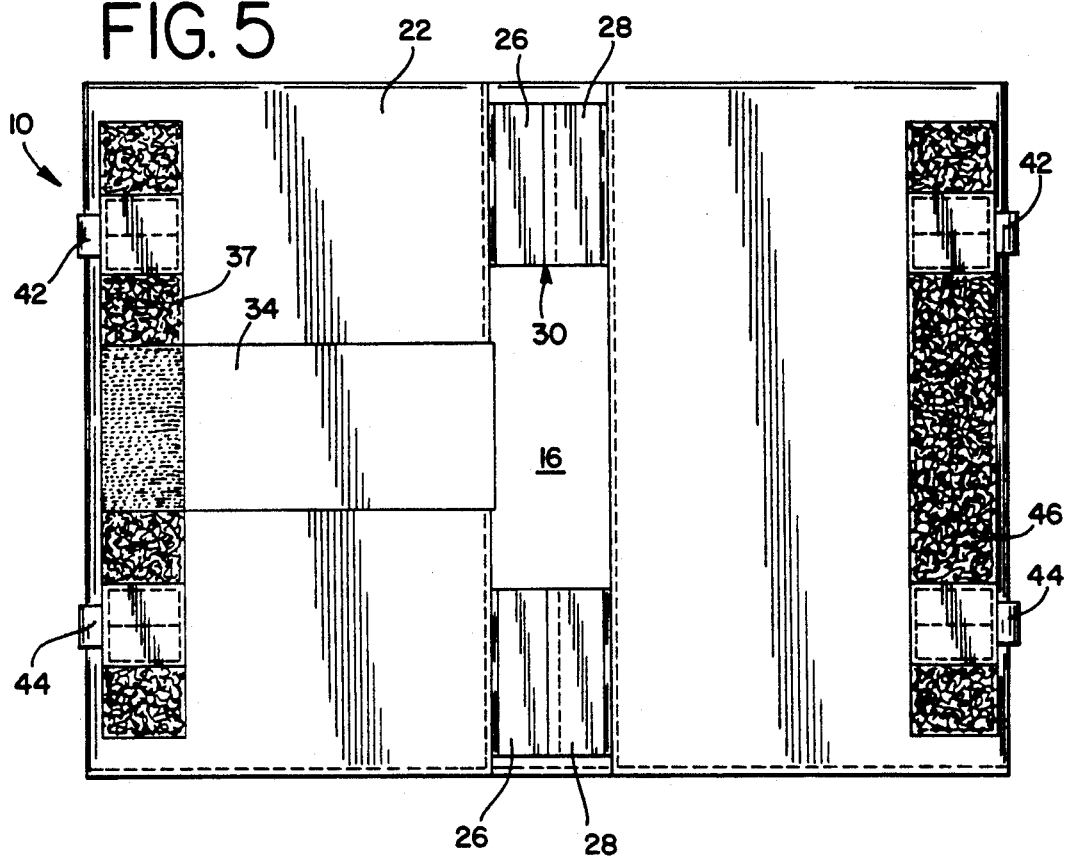
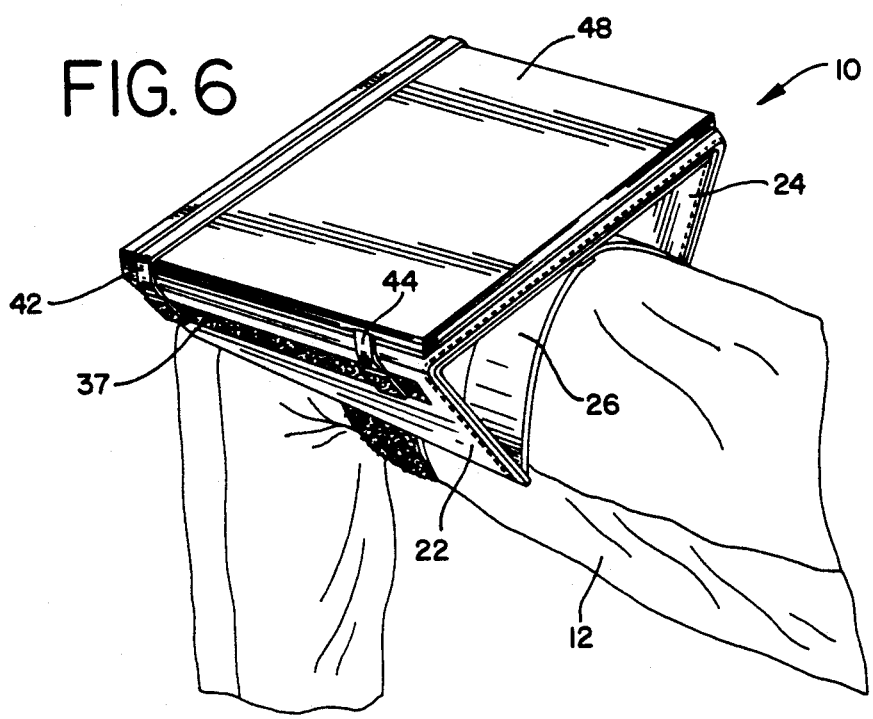

5,263,423

ARTICLE SECUREMENT DEVICE

This application is a continuation of application Ser. No. 07/832,467, filed Feb. 7, 1992, now abandoned.

BACKGROUND OF THE INVENTION

The present invention relates generally to lapboards and, moire specifically, to an apparatus for releasably securing an article such as a laptop computer to the leg of a user.

Recent advances in the reduction in size and increase in computing power of microelectronics has resulted in a proliferation of personal computers. A common configuration of personal computer is the laptop computer, a term commonly used to denote computers having a length on the order of 10 to 14 inches and a width on the order of 6 to 9 inches and usually including an integrated stand-up display. The name "laptop computer" is also descriptive of the common manner of use of such computers, i.e., resting in the lap of a user.

While laptop computers are convenient due to their size, weight, and portability, they are awkward to balance on the lap of a user, particularly if typing entries are being made in the keyboard. Moreover, the range of motion of a user is severely limited without picking up and placing the laptop computer on a stable surface.

Lapboards have been in use for many years, particularly by airplane pilots who use such devices to steady charts, checklists, and the like in their laps while operating an airplane. An example of a typical lapboard is described in U.S. Pat. No. 3,407,757. The lapboard is releasably secured to the leg of a user to provide a semi-stable surface which permits a more expanded range of motion of the user.

A lapboard must have a sufficient degree of stability when mounted to the leg of a user to support the desired article and to permit ordinary use of the article. The prior art method for achieving such stability is to add rigid shoulders to the underside surface of the lapboard, which shoulders will be positioned during use on either side of the leg of a user. The drawback of such lapboards, however, is that they do not sit in a flat, compact position when removed from the leg of a user and placed on a typical flat surface such as a table or desk. Accordingly, a user of these lapboards must typically detach the articles from the lapboard for use thereof other than in the lap of a user.

SUMMARY OF THE INVENTION

The invention consists of a lapboard for semi-permanent attachment to a laptop computer, pad of paper, or the like, which is adaptable between an operating position attached to the leg of a user and a folded, compact storage position closely adjacent to the underside of the laptop computer or other article. The lapboard includes a substantially rectangular table member and a pair of in-folding leg members, one each of which is attached on either side portion of the table member for hinged movement below the table member. Elastic webbing interconnects the free end portions of each of the leg members to a central portion of the underside of the table member. A pair of straps associated with the leg members are used to releasably secure the lapboard to a leg of a user. In use, the central portion of the underside of the table member will rest atop the leg of a user. The leg members will be in supporting contact engagement with a corresponding side of the user's leg and act to brace the table member against pivotal displacement around the leg of the user. The elastic webbing which interconnects the leg members and the underside of the table member will stretch to conform to the contour of the upper surface of the user's leg and the strap members will extend below and around the under surface of the leg to create a snug fit thereabout. A plurality of straps are used to releasably secure the laptop computer or other article to the upper surface of the table member.

An object of the invention is to provide a securement device for releasable attachment to a user's leg for stably supporting a laptop computer or other article.

A further object of the invention is to provide a lapboard which, when detached from a user's leg, folds to a compact storage position closely adjacent to the underside of the article to which the lapboard is attached.

Another object of the invention is to provide a lapboard for supporting a laptop computer or other article on the leg of a user to permit standing and limited motion of the user without detachment of the lapboard or supported article.

These and other objects of the invention will become apparent upon a review of the following specifications, attached drawings, and claims.

BRIEF DESCRIPTION OF THE INVENTION

FIG. 2 is a side elevational view of the invention shown in the folded, storage position.

FIG. 3 is a side elevational view of the invention in the unfolded position preliminary to attachment to a leg of a user.

FIG. 4 is a cross sectional view taken along the line 4—4 of FIG. 21.

FIG. 5 is a bottom plan view of the invention in the folded, storage position.

FIG. 6 is a perspective view of the invention attached to the leg of a user wherein a pad of paper is supported on the invention.

DETAILED DESCRIPTION OF A PREFERRED EMBODIMENT

Figure 1:
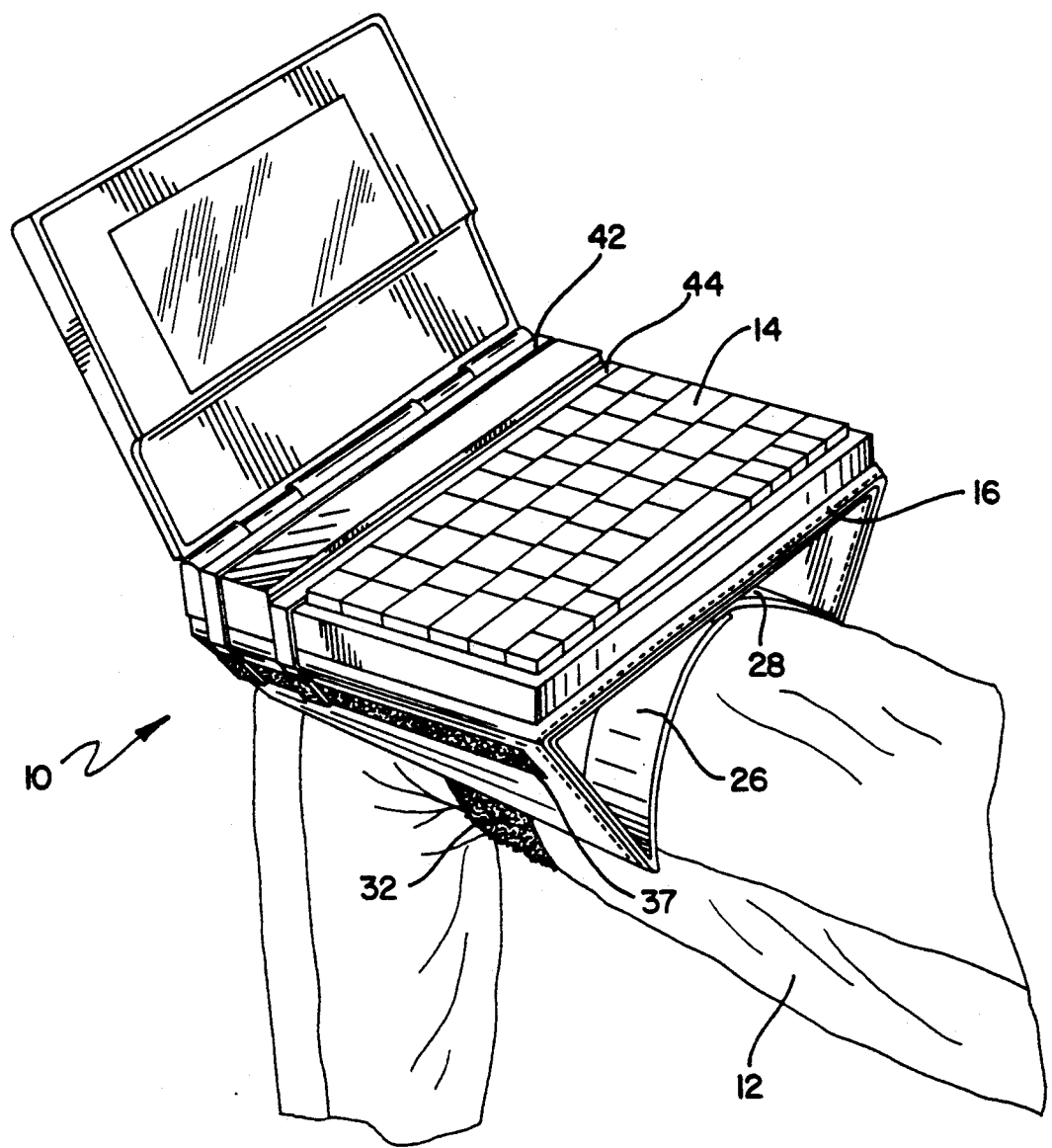
FIG. 1 is a perspective view of the invention attached to a user's leg and supporting a laptop computer.

Illustrated in FIG. 1, generally at 10, is a securement device for releasable attachment to a leg 12 of a user. In the preferred embodiment, a laptop computer 14 is releasably secured to and supported by the securement device 10 in a convenient position for operation by a user.

The securement device 10 includes a substantially rectangular table member 16 which has a left side edge portion 18 and a right side edge portion 20 (FIGS. 2 and 3). A pair of substantially rectangular leg members, left leg 22 and right leg member 24, are attached at an upper or outer edge portion thereof to the side edge portions 18 and 20, respectively, of the table member 16 for hinged movement therebelow by hinge means 19 and 20. The free end portions of the leg members 22 and 24 are independently interconnected to a central region on the underside of the table member 16 by elastic webbing 26 and 28, respectively. In the preferred embodiment, the elastic webbing 26 and 28 is sewn both to the free end sections of the leg members 22 and 24 and to the underside of the table member 16 at 30. A pair of coacting straps 32 and 34 are attached to the free end portions of the leg members 22 and 24, respectively. The strap 34 includes a length of elastic webbing to assist in securing the device 10 to a user's leg.

The construction of the securement device 10 permits the leg members 22 and 24 to be folded inwardly to be adjacent to the underside of the table member 16, as illustrated in FIG. 2. The elastic webbing 26 and 28, being flexible, will automatically fold and be retained between the table member 16 and the leg members 22 and 24. The strap 34 includes a section of loop and hook fastening material 36 by which it may be releasably attached to a corresponding and cooperating area of such material 37 near the upper or leftmost edge of the outside surface of leg member 22 to provide an anchor point for the strap 34 which then acts to retain the leg members 22 and 24 in the in-folded, compact storage position.

The securement device 10 is releasably attached to the leg 12 of a user by grasping the free end portions of the leg members 22 and 24 and pivoting the leg members 22 and 24 outwardly while simultaneously moving the underside of the table member 16 into contact engagement with the upper surface of the user's leg 12. The elastic webbing 26 and 28 will stretch to conform substantially to the contour of the upper surface of the user's leg 12 whereby the free end portions of the leg members 22 and 24 will be in supporting engagement on either side of the user's leg 12. Attachment is completed by stretching the strap 34 underneath and around the user's leg 12 for releasable anchoring of the fastening portion 36 with a coacting fastening portion 38 associated with the strap 32. Since the leg members 22 and 24 are drawn toward the table member 16 by means of the elastic webbing 26 and 28, the leg members 22 and 24 are drawn into snug engagement with the user's leg 12. Because of this drawing action, the securement device 10 is capable of snugly accommodating various sized support structures. For very large or very small support structures, a corresponding larger or smaller securement device 10 may be used. As can be seen in FIG. 4, the user's leg 12 is substantially and snugly encircled by the elastic webbing 26 and 28 and the straps 32 and 34 so as to prevent relative pivotal movement of the securement device 10 about the longitudinal axis of the user's leg 12. Further, the leg members 22 and 24 brace the side edge portions 18 and 20 to stabilize the table member 16 and prevent relative pivoting between the table member 16 and the user's leg 12. Additionally, the leg members 22 and 24, the elastic webbing 26 and 28, and the straps 32 and 34 coact to prevent longitudinal, transverse, and pivotal displacement of the table member 16 relative to the user's leg 12, even if the user's leg 12 is rotated through a plurality of dimensional orientations such as when the user stands or takes a few steps with the securement device 10 still attached to the user's leg 12. It has been found that the securement device 10 provides a surprisingly stable and comfortable supporting surface on which a variety of activities may be performed.

The securement device 10 is useful for serving as a support for a large variety of articles. In the preferred embodiment, strips of coacting pairs of loop and hook fastening elements are located on the top surface of the table member 16. The lower or bottom element of such pairs are secured to the table member 16 and the coacting upper elements are secured to the underside of an article to be attached and supported by the securement device 10. Additionally, a pair of elastic straps 42 and 44 (FIGS. 3 and 5) are anchored at their end portions by coacting hook and loop fastening elements 37 and 46 associated with the leg members 22 and 24. As illustrated in FIG. 1, the elastic straps 42 and 44 are used in the preferred embodiment to encircle a laptop computer 46 to support it securely atop the table member 16. In an alternative embodiment, as illustrated in FIG. 6, the elastic straps 42 and 44 are used to secure a pad of paper 48 to the table member 16. It has been found that a laptop computer 46 is sufficiently secured to the user's leg as to permit a user to stand and take several steps without concern that the laptop computer will be displaced from the desired operating position on the user's leg.

Although the invention has been described with respect to a preferred embodiment thereof, it is to be also understood that it is not to be so limited since changes and modifications can be made therein which are within the full intended scope of this invention as defined by the appended claims.

I claim:

1. A securement device which may be releasably attached to a support structure, comprising:
    (a) a table member having a pair of opposing side portions;
    (b) a pair of in-folding leg members, one each of which is attached for hinged movement relative to a corresponding one of said side portions of said table member by a hinge means;
    (c) elastic means interconnecting said leg members to said table member centrally of said side portions;
    (d) means for releasably securing said table member to the support structure operably connected to said free end portion of each of said leg members, said securement means coacting with said leg members to brace the securement device against longitudinal, transverse, and pivotal displacement; and
    (e) means for securing a device for manipulation to said table member.

2. A securement device as described in claim 1, wherein said table member is substantially rectangular and said leg members are attached to transversely opposite edge, portions thereof.

3. A securement device as defined in claim 1, wherein said elastic means includes elastic webbing.

4. A securement device as defined in claim 1, wherein said leg members are moveable between an in-folded position against said table member and a folded out position extending said elastic means.

5. A securement device as defined in clam 4, wherein said in-folded leg members present a substantially flat, level supporting surface.

6. A securement device as defined in claim 1, wherein said releasable securement means includes a pair of releasably interconnecting strap portions.

7. A securement device as defined in claim 1, wherein said device is a computer.

8. A securement device as defined in claim 1, wherein said device is a pad of paper.

9. A securement device as defined in claim 1, wherein said free end portions of said leg members are oriented so as to contact the support structure when said table member is releasably attached to the support structure.

10. A securement device as defined in claim 1, wherein said elastic means conforms substantially to the support structure when said table member is attached to the support structure.

* * * * *